United States Patent Office 3,595,924
Patented July 27, 1971

3,595,924
CHEMICAL COMPOUNDS HAVING EMULSIFYING PROPERTIES
Gregoire Kalopissis, Paris, and Guy Vanlerberghe, Mitry-Mory, France, assignors to L'Oreal, Paris, France
No Drawing. Filed Oct. 23, 1967, Ser. No. 677,047
Claims priority, application Luxembourg, Oct. 21, 1966, 52,227; Oct. 24, 1966, 52,228; Oct. 6, 1967, 54,622
Int. Cl. C07c 43/04
U.S. Cl. 260—615                                    3 Claims

ABSTRACT OF THE DISCLOSURE

This invention relates to new emulsifiers responding to the formula:

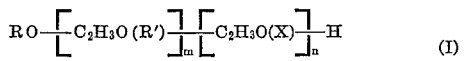
(I)

In this formula R indicates a saturated aliphatic radical comprising 12 to 20, and preferably 16 to 18 carbon atoms; R' indicates a methyl or ethyl radical; X indicates either:
 a hydroxymethyl radical
 a radical responding to the formula:

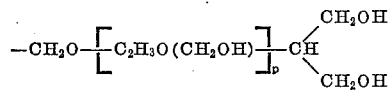

or a radical responding to the formula:

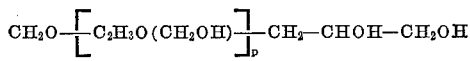

$m$ is a number between 1 and 10, preferably between 2 and 6, inclusive; $n$ is a number equal to or greater than one, but no greater than 5; and $p$ is a number between 0 and 10 inclusive, the product $n(p+2)$ being between 2 and 12 inclusive. The invention also includes cosmetic compositions comprising such emulsifiers.

---

This invention relates to new chemical compounds which may be used as emulsifiers or peptizing agents, particularly in the cosmetic industry. These compounds are essentially characterized by the fact that they respond to the following formula:

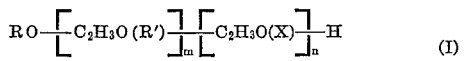

In this formula R indicates a saturated aliphatic radical comprising 12 to 20, and preferably 16 to 18 carbon atoms; R' indicates a methyl or ethyl radical; X indicates either:
 a hydroxymethyl radical
 a radical responding to the formula:

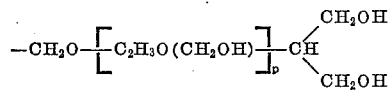

or a radical responding to the formula:

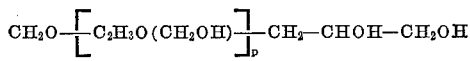
(I)

$m$ is a number between 1 and 10, preferably between 2 and 6, inclusive; $n$ is a number equal to or greater than one, but no greater than 5; and $p$ is a number between 0 and 10 inclusive, the product $n(p+2)$ being between 2 and 12 inclusive.

The compounds responding to Formula I above are generally emulsifiers making it possible to obtain "water-in-oil" emulsions when the product $n(p+2)$ is less than about 4.

When, on the contrary, the product $n(p+2)$ is greater than abouut 4, the compounds of Formula I are generally emulsifiers which make it possible to obtain emulsions of the "oil-in-water" type.

It should be noted that, in a given compound, the R' radicals which serve as substituents on the ethoxamer may be identical of different. In this latter case, they may be distributed in variable proportions either in regular sequences or in an irregular manner, depending on whether the polycondensation of the pure epoxides is carried out in several distinct steps or whether mixtures of propylene oxide and butylene oxide are used.

Another object of the present invention is to provide a new method of preparing the compounds of Formula I essentially characterized by the fact that, in a first step, there is polycondensed on a fatty alcohol having the formula ROH, an epoxide or mixture of epoxides having the formula:

(II)

in which R' represents a methyl or ethyl radical, after which there is polycondensed on the alcohol a glycerol epihalohydrin or a polyhalogenated glycidyl polyether having the formula:

(III)

in which Y represents either:
 a —CH$_2$Z radical

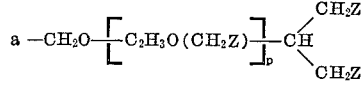

or

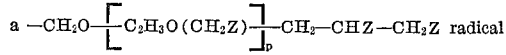 radical in which Z represents a halogen atom, preferably chlorine or bromine. These polycondensations are carried out in the presence of an acid catalyst such as boron fluoride or stannic chloride at a temperature between 25° C. and 150° C. In a second step the compounds obtained in the first step are hydroxylated by means of an alkaline salt of carboxylic acid, preferably in a solvent which not only makes the reagents miscible but also facilitates the separation of the mineral halide formed.

In a preferred embodiment of the invention the polycondensation takes place in an autoclave or in a container which communicates with the atmosphere through a reflux condenser. When this polycondensation catalyst is boron fluoride, it is used in the form of a complex with acetic acid or ether. The quantity of boron fluoride, expressed in terms of BF$_3$ per 100 g. of reagents, is between 0.1% and 1% and preferably between 0.4 and 0.5%. It is preferred that the temperature be kept below 100° C., for example, between 70 and 80° C.

If the new emulsifiers are to be strongly hydrophilic, the value of $n$ should be greater than 1 and, better yet, when X represents the CH$_2$OH radical, at least equal to 2. Moreover, the parameter $m$ should have a value high enough that the oxypropylenated or oxybutylenated alcohol obtained in the first polycondensation step will have a melting point below 40° C. The lower limits of $m$ and $n$ are thus determined by the physio-chemical properties of the emulsifiers produced.

With respect to the hydroxylation step, it should be noted that the alkaline salt of carboxylic acid used may advantageously be an acetate, in stoichiometric proportions, or slightly in excess (10 to 15% at the maximum) in proportion to the halogenated compounds which participate in the reaction. It has been found that the results remained satisfactory regardless of whether the acetates were added all at once at the beginning of the hydroxylation step, or little by little during the course of the reaction. It is possible to regenerate the acetates "in situ" from the esters formed in the course of the reaction, for example, by adding an aqueous solution of an alkaline hydroxide with instantaneous evaporation of the water.

The solvents selected for hydroxylation act by progressive alcoholysis of the esters formed in an intermediate stage. Among the solvents having the requisite properties are propylene glycol, di-propylene glycol, diethylene glycol and its ethers, ethylene-glycol, hexylene glycol, and butoxy-2-ethanol, the boiling points of which are high enough to make it unnecessary to use an autoclave. In general, it has been found that the weight of solvent to be used during the hydroxylation step must be equal to at least 50% of that of the polyhalogenated ether which is to be hydroxylated, and preferably, to 100 to 400% thereof. The hydroxylation reaction must be carried out at a temperature high enough for the reaction to occur with reasonable rapidity and low enough to avoid degradation of the products produced. A temperature between 150° C. and 200° C., and preferably between 180° C. and 190° C., meets these conditions. The hydroxylation percentage under these conditions is always over 90%.

In order to avoid coloring the products obtained during the hydroxylation reaction, it suffices to add reducing agents such as sodium hypophosphite or the alkaline borohydrides.

The crude product of this process may be advantageously purified by washing it in hot water, thus eliminating the water-soluble impurities, and particularly the electrolytes, which is especially desirable when preparing emulsions of the "water-in-oil" type.

Among the preferred compounds according to Formula I are those in which the radical R is a saturated linear radical containing 16 to 18 carbon atoms. Moreover, when the compounds according to Formula I are to be used in emulsions of the "water-in-oil" type, the preferred compounds are those having a relatively short hydrophilic chain, in which $n$ has a value between 2 and 3, for example, and X is a hydroxymethyl radical.

As compared with those emulsifiers consisting of unsaturated liquid derivatives such as the derivatives of oleic alcohol, the emulsifiers according to the invention have the advantage that they do not become rancid. Moreover, they are non-toxic, even when applied to the skin, which is an extremely important criterion in the case of the cosmetic applications envisaged.

It is accordingly an object of the present invention to provide emulsions which may be used in cosmetic products or pharmaceutical excipients, essentially characterized by the fact that they contain at least one composition according to Formula I.

In the cosmetic field the compounds according to Formula I may be used as bases in making a moisturizing lotion, or nourishing cream. They may also be used as carriers for hair dyes, and in that case, may produce dyes in the form of gels.

Another object of the present invention is therefore to provide a dye for human hair essentially characterized by the fact that it comprises as a carrier at least one compound according to Formula I mixed with conventional cosmetic dyes.

The new chemical compositions according to Formula I may also at as peptizing agents, which are particularly efficacious in dispersing solid powdered material in liquid media, and especially in oil.

It is therefore another object of the present invention to provide dispersions of solid pulverulent products in liquid media and particularly in oils, characterized by the fact that they contain as peptizing agents at least one compound according to Formula I.

In order that the invention may be better understood, several examples thereof will now be described, purely by way of illustration, without suggesting that the scope of the invention is limited to the details thereof.

EXAMPLE I

Preparation of the compound having the formula:

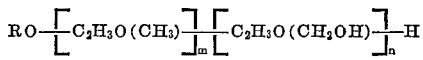

in which R is a stearyl radical, $m$ has a statistical average value of 5 and $n$ has a statistical average value of 2.

First step: Polycondensation 2 ml. of an acetic complex containing 36% BF$_3$ is added to 86 g. of commercial stearyl alcohol (having a hydroxyl index of 195 mg. KOH/g.) which has been dehydrated under vacuum by heating it in a boiling water bath, and melted.

The mixture is heated to 75–80° C. and 82 g. of propylene oxide is then introduced, drop by drop, at a rate such as to maintain the temperateure at 75–80° C., because of the exothermic nature of the reaction. This step takes an hour and 30 minutes. Agitation of the reaction mixture is continued while it is permitted to cool to 40° C. before withdrawing a sample, the epoxide content of which is determined. At this stage the propylene oxide has been entirely consumed.

The temperature of the oxypropylenated alcohol is increased to 80° C., and 52 g. of glycerol epichlorohydrin is then introduced drop by drop over a period of 25 minutes.

The epichlorohydrin is poly-condensed at 80–85° C. and the temperature maintained as before by regulating the speed at which the epoxide is introduced.

The result is a polychlorinated polyether having the formula:

in which R, $m$, and $n$ have the significances mentioned earlier in the description of this example. This product is twice washed with 200 ml. of boiling water, and then vacuum dried. 186.5 g. of polychlorinated polyether is recovered, in the form of a yellow oil.

Second step: Hydroxylation 39 g. of anhydrous potassium acetate is dissolved in 190 g. of dipropylene-glycol, and the solution thus obtained is heated to 180° C. under a nitrogen atmosphere. 152.5 g. of the polychlorinated ether prepared in the first step is then added while stirring over a 40 minute period. The temperature is then kept at 180° C. for 3 hours. The potassium chloride is separated by filtration, and the dipropylene glycol is then evaporated under vacuum.

This produces a polyhydroxylated polyether, the formula of which is given at the beginning of this example, and which is partially esterified by acetic acid (saponification index: 20 mg. KOH/g.). In order to de-acetylate it, this product is placed in 350 ml. of absolute alcohol, and 2.5 g. of a 25% solution of sodium methylate in methanol is added as a catalyst to promote alcoholysis. The mixture is left at room temperature overnight, and the ethyl acetate and alcohol which have been formed are then eliminated.

140 g. of a semi-solid product is recovered, and becomes completely liquefied at about 30°.

EXAMPLE 2

Preparation of the compound having the formula:

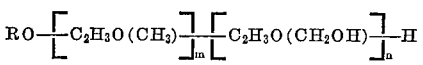

in which R is a cetyl radical, $m$ has an average value of 4 and $n$ an average value of 2.

First step: Polycondensation 69.5 g. of propylene oxide, followed by 55.5 g. of glycerol epichlorohydrin is reacted at 75–80° C. with 75 g. of cetyl alcohol, using the same procedure as in Example 1, in the presence of 1.6 ml. of an acetic complex of boron fluoride containing 36% BF₃.

This produces a polychlorinated polyether having the formula:

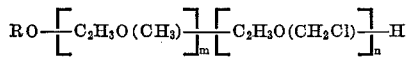

in which R, $m$ and $n$ have the values indicated near the beginning of this example. This product is purified as before, by washing in boiling water.

Second step: Hydroxylation

The chlorine is replaced by a hydroxyl radical by using potassium acetate, with dipropylene glycol as a solvent, and heating to 180°–185° C. for three hours. After filtering and evaporation of the solvent, the de-acetylization is terminated by ethanolysis in the presence of sodium methylate as a catalyst. This produces a polyhydroxylated polyether responding to the formula given at the beginning of this example.

This product is liquid at room temperature. This may be purified by washing it in boiling water. This eliminates the water-soluble impurities, and especially the electrolytes.

EXAMPLE 3

Preparation of the compound having the formula:

in which R is a stearyl radical, $m$ has an average value of 3 and $n$ has an average value of 2.

First step: Polycondensation 2.2 ml. of an acetic complex containing 36% BF₃ is added to 115 g. of commercial stearyl alcohol (hydroxyl index: 195 mg. KOH/g.) which has been dehydrated by heating under vacuum in a water bath, and melted. The mixture is heated to 75°–80° C., and 86.4 g. of butylene oxide is then introduced drop by drop, while maintaining the temperature at 75°–80° C. This step takes 30 minutes.

74 g. of glycerol epihalohydrin is added to the resulting product, at 80° C., over a period of 25 minutes. This produces a polychlorinated polyether, the average composition of which is represented by the formula:

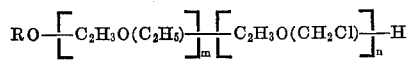

in which R, $m$, and $n$ have the significances indicated in the early part of this example.

Second step: Hydroxylation 241 g. of the polychlorinated polyether obtained in the first step is reacted with 68.5 g. of potassium acetate in the presence of 310 g. of dipropylene glycol. After 3 hours and 30 minutes of heating at 180° C., 96% of the potassium acetate is consumed.

After filtration and evaporation of the solvent, the de-acetylation is terminated by ethanolysis, in the presence of sodium methylate, which acts as a catalyst. The crude product thus obtained is twice washed with 250 ml. of boiling water and then dried under vacuum. A semi-solid bright yellow product is recovered having an average composition represented by the formula given at the beginning of this example.

EXAMPLE 4

Preparation of a composition having the formula:

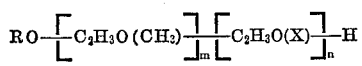

in which R is a stearyl radical; X is the

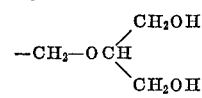

radical; $m$ has an average value of 5 and $n$ has an average value of 3.

First step: Polycondensation

The glycidyl ether of 1,3-dichloro-2-propanol responding to the formula:

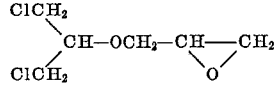

is formed by reacting glycerol epichlorohydrin with 1,3-dichloro-2-propanol, followed by dehydrohalogenation of the corresponding chlorohydrin, which has been isolated by fractional distillation.

0.7 ml. of an acetic complex containing 36% BF₃ is added to 23 g. of dehydrated stearyl alcohol. 24 g. of propylene oxide is then added to the mixture while maintaining the temperature at 80° C. 44.6 g. of the glycidyl ether of 1,3-dichloro-2-propanol is then added, over a period of 30 minutes, to the resulting polypropyleneglycol ether.

The result is a polychlorinated polyether, the average composition of which is represented by the following formula:

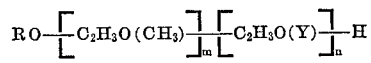

in which R, $m$, and $n$ have the significances indicated at the beginning of this example, and Y indicates the radical:

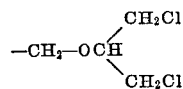

Second step: Hydroxylation

In the same way as in Example 1, the polychlorinated ether is reacted with potassium acetate, and then de-acetylated. The result is a polyhydroxylated polyether, the average composition of which is represented by the formula given at the beginning of the example.

This product may be dispersed in water and has gel-forming properties.

EXAMPLE 5

Preparation of a compound having the formula:

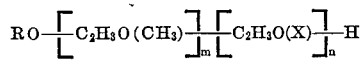

in which R is a stearyl radical; X is

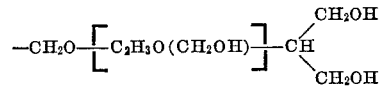

$m$ has a statistical average value of 5 and $n$ has an average value of 3.

The product is obtained in essentially the same way as in Example 2, except that during the polycondensation one uses the glycidyl ether of (1;3′ dichloro-propoxy)-chloro-propanol responding to the formula:

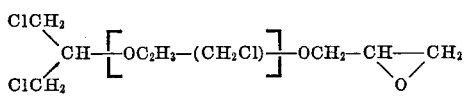

The glycidyl ether is isolated by fractional distillation and has the following properties:

Epoxy content: 3.7 gram milliequivalents
Boiling point: 140° C. at a pressure of 0.1 mm. of mercury The polyhydroxylated polyether prepared by substitution of the chlorine is a solid soluble in either hot or cold water.

EXAMPLE 6

8 g. of a compound responding to the formula:

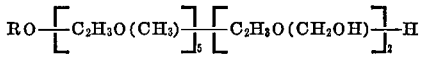

in which R represents a stearyl radical, are dissolved in a mixture containing:

29 g. of paraffin
2 g. of bleached ozokerite
1 g. of powdered polyethylene and heated to 90° C. in a water bath.

60 g. of water which has first been heated to 80° C. is then poured into the mixture. It is then permitted to cool, while agitation is continued.

This produces a very stable emulsion.

EXAMPLE 7

9 g. of a compound having the formula:

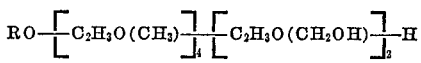

in which R is a cetyl radical, is dissolved in a mixture composed of:

20 g. of fluid petrolatum
10 g. of alkyl myristate
1 g. of microcrystalline wax while heating in a water-bath to about 90° C.

60 g. of water, which has first been heated to 80° C. is then poured in, while stirring vigorously. It is then left to cool while still stirring. A very stable emulsion results.

EXAMPLE 8

An emulsion is prepared by dissolving by heating 9 g. of a compound responding to the formula:

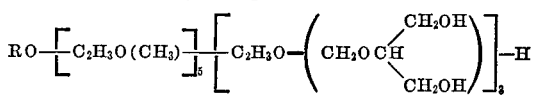

in which R is a stearyl radical, in a mixture containing 30 g. of paraffin oil and 4 g. of microcrystalline wax.

57 g. of hot water are then added while stirring vigorously. The mixture is then permitted to cool, while still stirring. The result is a moisturizing lotion.

EXAMPLE 9

An emulsion is prepared by mixing 7 g. of cetyl alcohol with 4 g. of a compound responding to the formula:

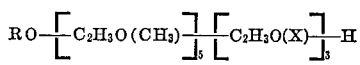

in which formula R is a stearyl radical and X is:

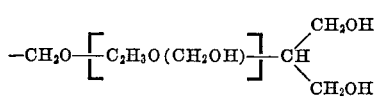

This mixture of fatty alcohol and emulsifier is introduced into 30 g. of paraffin oil. It is then poured into 59 g. of hot water, which is being vigorously agitated, and the mixture is permitted to cool, while agitation is continued. The result is a cosmetic cream which may be used as a nourishing cream.

EXAMPLE 10

The following dyeing composition is prepared: Compound having the formula:

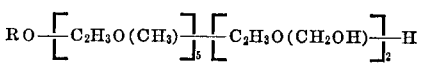

in which R represents a stearyl radical: 15 g.

Nonylphenol oxyethylenated with 9 molecules of ethylene oxide: 15 g.
Oleic acid: 7 g.
Lauric alcohol: 8 g.
Ethylene glycol monobutylether: 9 g.
Propylene glycol: 4 g.
20% ammonia: 10 cm.$^3$
Paratoluylenediamine: 1 g.
Meta-diaminoanisol sulfate: 0.05 g.
Resorcinol: 0.5 g.
Meta-aminophenol: 0.15 g.
Para-aminophenol: 0.1 g.
Sodium salt of ethylene-diamino-tetra-acetic acid: 4 g.
40% sodium bisulfite: 1.5 cm.$^3$
Water, q.s.p.: 100 g.

This composition is mixed with an equal quantity of 6% hydrogen peroxide. The result is a gel which is applied to 100% white hair. It is left to act thereon for 30 minutes. The hair is then washed and rinsed. A chestnut shade results.

EXAMPLE 11

The following dyeing composition is prepared: Compound having the formula:

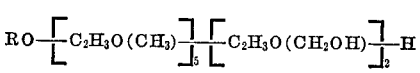

in which R represents a stearyl radical: 15 g.
Nonylphenol oxyethylenated with 9 molecules of ethylene oxide: 15 g.
Cetyl-trimethyl ammonium chloride: 3 g.
Oleic acid: 7 g.
Lauric alcohol: 7.5 g.
Ethylene-glycol monobutylether: 9 g.
Propyleneglycol: 4 g.
20% ammonia: 11 cm.$^3$
Paratolylenediamine: 0.7 g.
Meta-diaminoanisol sulfate: 0.03 g.
Resorcinol: 0.4 g.
Meta-aminophenol: 0.10 g.
Para-aminophenol: 0.08 g.
Sodium salt of ethylene-diamino-tetra-acetic acid: 4 g.
40% sodium bisulfite: 1.5 cm.$^3$
Water, q.s.p.: 100 g.

This composition is mixed with an equal quantity of 6% hydrogen peroxide. The result is a gel which is applied to 100% white hair. It is left to act on the hair for 30 minutes, and the hair is then washed and rinsed. The result is a bright chestnut shade.

EXAMPLE 12

Powdered pigments in oil are used for cosmetic purposes. These pigments, which are often obtained by precipitation, are dried. Upon drying they tend to re-agglomerate, so that they must be ground before being mixed with the oil. The fineness with which they may be ground is limited by the mechanical means for grinding them. It might be thought that the product precipitated in water could be dried in the presence of oil. However, experience has shown that, while insoluble in water, many of the pigments are not wetted by the oil and re-agglomerate while drying. It has been established that if the pigments are dried in the presence of a peptizing agent according to the invention, consisting of a compound according to Formula I the pigment will redisperse in the oil while retaining its original degree of fineness.

The present example relates to the peptization of barium sulfate.

Barium sulfate is precipitated by pouring a 2.4 N solution of barium chloride into a 1.6 N solution of boiling sodium sulfate, while stirring. The precipitate is washed by simple decantation. It is very fine and very few of the particles have a dimension greater than 4μ. 5% of the compound having the following formula is then added:

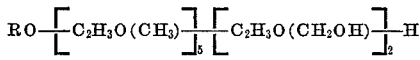

In this formula R represents a stearyl radical, or a certain percentage of another peptizing agent according to Formula I, the percentage being determined by the quantity of barium sulfate.

This is carefully dried. The resulting powder is perfectly wetted by the oil and may be introduced into emulsions. The case of barium sulfate is merely representative; pigments such as titanium oxide, iron oxide, or Guiment's blue may also be peptized in this manner.

What is claimed is:

1. A chemical compound responding to the formula:

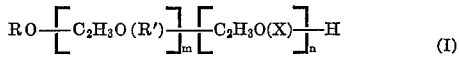 (I)

in which R is an alkyl having from 12 to 20 carbon atoms, R' is selected from the group consisting of ethyl and methyl, X is selected from the group consisting of: hydroxymethyl and

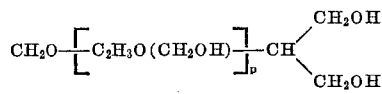

$m$ is a whole number between 1 and 10 inclusive, $n$ is a number between 1 and 5 inclusive, $p$ is a number between 0 and 10 inclusive, and the product $n(p+2)$ is between 2 and 12 inclusive.

2. A compound of claim 1 in which R has from 16 to 18 carbon atoms, and $m$ lies between 2 and 6 inclusive.

3. A method for preparing a compound having the formula

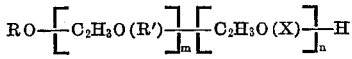

wherein R is alkyl having from 12 to 20 carbon atoms, R' is selected from the group consisting of ethyl and methyl, X is selected from the group consisting of hydroxy methyl and

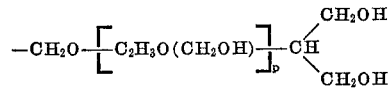

$m$ is a number between 1-10 inclusive, $n$ is a number between 1 and 5 inclusive, $p$ is a number between 0 and 10 inclusive, and the product $n(p+2)$ is between 2 and 12 inclusive, the steps comprising (1) polycondensing on a fatty alcohol having the formula ROH wherein R has the meaning given above, an epoxide having the formula

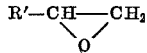

wherein R' has the meaning given above and thereafter a halogen containing member having the formula

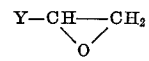

wherein Y is selected from the group consisting of —CH$_2$Z and

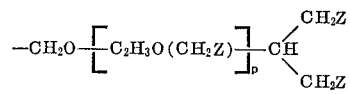

wherein Z is selected from the group consisting of chlorine and bromine, at a temperature between 25° C.–150° C. in the presence of an acid catalyst selected from the group consisting of boron fluoride and stannic chloride, (2) hydroxylating the resulting condensate from (1) by esterifying with potassium acetate at a temperature between 150° C.–200° C. in the presence of a solvent selected from the group consisting of propylene glycol, dipropylene glycol, diethylene glycol, the ethers of diethylene glycol, ethylene glycol, hexylene glycol and butoxy-2-ethanol, said potassium acetate being present in amounts ranging between stoichiometric and 15% in excess of stoichiometry based on said halogen containing member and said solvent being present in amounts of at least 50% of said halogen containing member and (3) deacylating by alcoholysis the ester formed in (2) above.

References Cited

UNITED STATES PATENTS

| | | | |
|---|---|---|---|
| 2,226,119 | 12/1940 | De Groote et al. | 260—615BX |
| 2,327,053 | 8/1943 | Marple et al. | 260—615BUX |
| 2,380,185 | 7/1945 | Marple et al. | 260—615B |
| 2,510,540 | 6/1950 | Ballard et al. | 260—615B |
| 2,536,685 | 1/1951 | Harman et al. | 260—615BX |
| 2,581,464 | 1/1952 | Zech | 260—615BUX |
| 2,778,855 | 1/1957 | Shokal et al. | 260—615X |
| 2,870,222 | 1/1959 | Carter | 260—615B |
| 2,971,989 | 2/1961 | Lapporte et al. | 260—636 |

FOREIGN PATENTS

| | | | |
|---|---|---|---|
| 1,477,048 | 3/1967 | France | 260—615 |

OTHER REFERENCES

Groggins, Unit Processes in Organic Synthesis, McGraw-Hill Book Co., New York, 1952, pp. 598, 616–620.

Chem. Abst. 66, 58805 (Netherlands 6605468, Oct. 24, 1966). Oreal.

HOWARD T. MARS, Primary Examiner

U.S. Cl. X.R.

8—10.2; 424—170, 358; 252—351